United States Patent
Zhu

(10) Patent No.: US 7,512,236 B1
(45) Date of Patent: Mar. 31, 2009

(54) SYSTEM AND METHOD FOR SECURE MOBILE COMMERCE

(75) Inventor: Jeffrey Zhu, Richmond Hill (CA)

(73) Assignee: Mark IV Industries Corporation, Mississauga, Ontario ( * ) Notice: Subject to any disclaimer, the term of this patent is extended or adjusted under 35 U.S.C. 154(b) by 856 days.

(21) Appl. No.: 10/912,997

(22) Filed: Aug. 6, 2004

(51) Int. Cl.
*H04L 9/12* (2006.01)
(52) U.S. Cl. .......................... 380/255; 705/64; 705/79
(58) Field of Classification Search ................. 380/280
See application file for complete search history.

(56) References Cited

U.S. PATENT DOCUMENTS

| | | | |
|---|---|---|---|
| 4,104,630 A | 8/1978 | Chasek | |
| 4,303,904 A | 12/1981 | Chasek | |
| 4,783,798 A * | 11/1988 | Leibholz et al. ............. | 713/155 |
| 4,870,419 A | 9/1989 | Baldwin et al. | |
| 4,937,581 A | 6/1990 | Baldwin et al. | |
| 5,086,389 A | 2/1992 | Hassett et al. | |
| 5,132,687 A | 7/1992 | Baldwin et al. | |
| 5,144,553 A | 9/1992 | Hassett et al. | |
| 5,164,732 A | 11/1992 | Brockelsby et al. | |
| 5,196,846 A | 3/1993 | Brockelsby et al. | |
| 5,253,162 A | 10/1993 | Hassett et al. | |
| 5,266,947 A | 11/1993 | Fujiwara et al. | |
| 5,289,183 A | 2/1994 | Hassett et al. | |
| 5,310,999 A | 5/1994 | Claus et al. | |
| 5,351,187 A | 9/1994 | Hassett | |
| 5,424,727 A | 6/1995 | Shieh | |
| 5,425,032 A | 6/1995 | Shloss et al. | |
| 5,485,520 A | 1/1996 | Chaum et al. | |
| 5,602,375 A | 2/1997 | Sunahara et al. | |
| 5,640,156 A | 6/1997 | Okuda et al. | |
| 5,657,008 A | 8/1997 | Bantli | |
| 5,675,342 A | 10/1997 | Sharpe | |
| 5,686,920 A * | 11/1997 | Hurta et al. .................... | 342/42 |
| 5,701,127 A | 12/1997 | Sharpe | |
| 5,748,106 A | 5/1998 | Schoenian et al. | |
| 5,751,973 A | 5/1998 | Hassett | |
| 5,771,021 A | 6/1998 | Veghte et al. | |

(Continued)

FOREIGN PATENT DOCUMENTS

EP  0 333 679  9/1989

(Continued)

OTHER PUBLICATIONS

Schwiderski-Grosche et al, "Secure Mobile Commerce", Electronics & Communication Engineering Journal, Oct. 2002, pp. 228-238.*

(Continued)

*Primary Examiner*—Matthew B Smithers
(74) *Attorney, Agent, or Firm*—Hanley, Flight & Zimmerman LLC

(57) ABSTRACT

A method and system for secure communications in a mobile commerce system having a pre-defined communications protocol. The method and system are backward compatible, providing reader configured to distinguish between a first type of transponder using an unencrypted protocol and a second type of transponder using an encrypted protocol. The reader determines the type of transponder and alters its communications protocol accordingly. The encrypted protocol provides for encrypted communications within the constraints of the existing pre-defined communications protocol.

34 Claims, 9 Drawing Sheets

U.S. PATENT DOCUMENTS

| | | | |
|---|---|---|---|
| 5,777,565 | A | 7/1998 | Hayashi et al. |
| 5,805,082 | A | 9/1998 | Hassett |
| 5,819,234 | A | 10/1998 | Slavin et al. |
| 5,831,547 | A | 11/1998 | Ohtsuki et al. |
| 5,841,866 | A | 11/1998 | Bruwer et al. |
| 5,850,191 | A | 12/1998 | Yagi et al. |
| 5,857,152 | A | 1/1999 | Everett |
| 5,859,415 | A | 1/1999 | Blomqvist et al. |
| 5,940,006 | A | 8/1999 | MacLellan et al. |
| 5,963,149 | A | 10/1999 | Nagura et al. |
| 6,025,799 | A | 2/2000 | Ho et al. |
| 6,085,805 | A | 7/2000 | Bates |
| 6,121,880 | A | 9/2000 | Scott et al. |
| 6,191,705 | B1 | 2/2001 | Oomen et al. |
| 6,219,613 | B1 | 4/2001 | Terrier et al. |
| 6,616,034 | B2 | 9/2003 | Wu et al. |
| 6,661,352 | B2 | 12/2003 | Tiernay et al. |
| 6,725,014 | B1 | 4/2004 | Voegele |
| 6,898,753 | B2 | 5/2005 | Bonifas |
| 2001/0050922 | A1* | 12/2001 | Tiernay et al. ............... 370/467 |
| 2004/0054900 | A1* | 3/2004 | He ............................... 713/168 |
| 2004/0196980 | A1* | 10/2004 | Turner et al. ................ 380/270 |
| 2005/0077349 | A1* | 4/2005 | Bonalle et al. .............. 235/380 |
| 2006/0071816 | A1 | 4/2006 | Tang et al. |
| 2006/0082470 | A1 | 4/2006 | Zhu et al. |
| 2007/0042796 | A1* | 2/2007 | Wenzel et al. ............... 455/507 |

FOREIGN PATENT DOCUMENTS

| | | | |
|---|---|---|---|
| JP | 10-105753 | | 4/1998 |
| WO | WO/9933027 | | 1/1999 |
| WO | WO2004100051 | * | 4/2004 |

OTHER PUBLICATIONS

U.S. Appl. No. 11/176,758, Wu.

Ching et al., *A Laser Micromachined Multi-Modal Resonating Power Transducer for Wireless Sensing Systems*, Sensors and Actuators A 97-98 (2002) 685-690, http://www.elsevier.com.

Finkenzeller, Klaus, *Ch. 3: Fudamental Operating Principles, RFID Handbook: Fundamentals and Applications in Contactless Smart Cards and Identification*, Klaus Finkenzellar, (2003) John Wiley & Sons, Ltd. ISBN 0-470-84402-7.

Sorrells, *Passive RFID Basics*, AN680, Michrochip Technology Inc., (1998) DS00680B.

U.S. Appl. No. 11/409,897, filed Apr. 24, 2006, Woo et al.
U.S. Appl. No. 11/409,741, filed Apr. 24, 2006, Woo et al.
U.S. Appl. No. 11/437,236, filed May 19, 2006, Tang et al.
U.S. Appl. No. 11/388,737, filed Mar. 24, 2006, Ho et al.
U.S. Appl. No. 11/284,277, filed Nov. 21, 2005, Tang et al.
U.S. Appl. No. 11/176,758, filed Jul. 7, 2005, Ho et al.
U.S. Appl. No. 11/054,520, filed Feb. 9, 2005, Tang.
U.S. Appl. No. 11/098,257, filed Apr. 4, 2005, Zhu.

Woo et al., Dual Mode Electronic Toll Collection Transponder, U.S. Appl. No. 11/409,897, filed Apr. 24, 2006.

Woo et al., Open Road Vehicle Emissions Inspection, U.S. Appl. No. 11/409,741, filed Apr. 24, 2006.

Ho et al., Compact Microstrip Transponder Antenna, U.S. Appl. No. 11/388,737, filed Mar. 24, 2006.

Tang et al., Method and System for Obtaining Traffic Information Using Transponders, U.S. Appl. No. 11/284,277, filed Nov. 21, 2005.

Ho et al., Dynamic Timing Adjustment in an Electronic Toll Collection System, U.S. Appl. No. 11/176,758, filed Jul. 7, 2005.

Tang, RF Transponder with Electromechanical Power, U.S. Appl. No. 11/054,520, filed Feb. 9, 2005.

Zhu, U.S. Phase Modulation for Backscatter Transponders, U.S. Appl. No. 11/098,257, filed Apr. 4, 2005.

Tang et al., Method of Enabling Two-State Operation of Electronic Toll Collection System, U.S. Appl. No. 11/437,236, filed May 19, 2006.

* cited by examiner

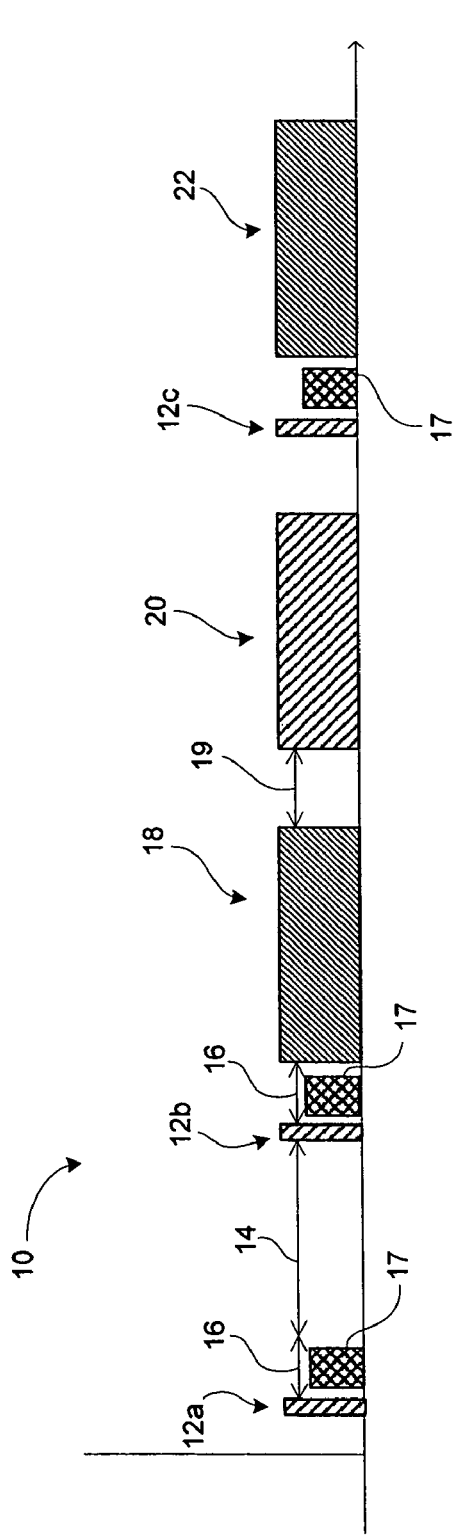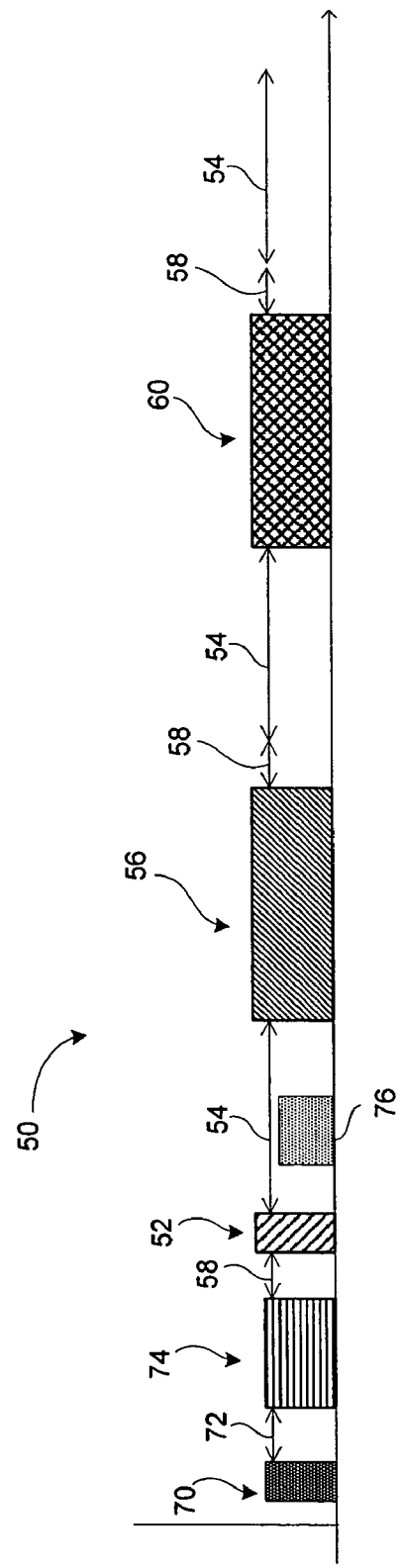

| Field Name | Field Type | Bits per | Description |
|---|---|---|---|
| Header | Factory | 3 | 111 |
| Tag Type | Factory | 3 | Specifies different versions or classes of transponder |
| Application ID | Factory | 3 | |
| Group ID | Factory | 7 | |
| Agency ID | Factory | 7 | |
| Serial Number | Factory | 24 | Unique to transponder |
| Vehicle Type | Agency | 5 | e.g. 1: motorcycle, 2: auto, etc. |
| Vehicle Axles | Agency | 4 | |
| Vehicle Weight | Agency | 1 | Over or under 7,000 lbs. |
| Revenue Type | Agency | 4 | |
| Mounting location | Agency | 2 | i.e. windshield, rooftop, license plate |
| Agency Data | Agency | 31 | |
| Reader ID | Reader | 12 | |
| Date | Reader | 9 | |
| Time | Reader | 17 | Seconds since midnight |
| Agency ID | Reader | 7 | Agency writing to transponder |
| Plaza ID | Reader | 7 | |
| Date | Reader | 9 | |
| Time | Reader | 17 | Seconds since midnight |
| Future use | Reader | 13 | |
| Agency data | Reader | 30 | Scratch pad for agency data |
| Txn number | Reader | 16 | |
| Error Check | Reader | 16 | 16-bit CRC |

Figure 2

SYSTEM AND METHOD FOR SECURE MOBILE COMMERCE

FIELD OF THE INVENTION

The present invention relates to a system and method for secure mobile commerce and, in particular, to encrypted mobile commerce communications.

BACKGROUND OF THE INVENTION

Communications systems for remote mobile communications are becoming more commonplace. Such systems are used in a variety of applications, including Automatic Vehicle Identification (AVI) for Commercial Vehicle Operations (CVO) and for Electronic Toll and Traffic Management (ETTM). Mobile commerce systems may also be used in other contexts, including automated payment at drive-through lanes for fast food outlets, automated payment at parking facilities, and automated payment at fueling stations. ETTM systems, for example, allow drivers to pay highway tolls without stopping, allowing a toll station to process a higher volume of traffic.

These systems typically provide for two-way communication between a reader and a transponder (or "tag"). The reader is usually at a fixed point, such as a toll plaza, and the transponder is usually mounted to a vehicle. The transponder stores information of interest to the transaction, including the identity of the vehicle, time, vehicle type, etc. In a mobile commerce system, the transponder also stores payment information, which may include pre-paid account identity, account balance details, credit card information, or other financial data.

Such communication systems use radio frequency (RF) signals to communicate between the reader and the transponder. These systems typically provide both "read" and "write" capabilities, permitting a reader to access the information stored in the transponder and permitting the transponder to update its stored data in response to instructions from the reader. For example, the reader at a toll plaza may receive and read the transponder information regarding the vehicle type, the most recent toll plaza or on-ramp used by the transponder, and the user's account details. It may then calculate a toll to be paid and transmit instructions to the transponder causing the transponder to debit the account balance stored in its local memory. The reader may also communicate with a remote central database containing account information for individual users to update the status of the user's account.

In operation, the reader sends an RF signal to the transponder. An antenna at the transponder receives the signal from the reader and responds thereto according to a pre-defined protocol. The transponder produces a series of signals, providing the reader with the data stored in the transponder.

Reader-transponder technologies use two physical modes of operation: active transmission or modulated backscatter. In active systems, the transponder includes an active transmitter which responds to interrogation or trigger signals from the reader with an active modulated RF response signal generated by the transponder. Backscatter systems involve a transponder that responds to a continuous wave (CW) RF signal generated by the reader by modulating the continuous wave, electrically switching the transponder's antenna from a reflective to an absorptive characteristic according to the transponder's modulating signal.

There are a number of pre-defined communication protocols for reader-transponder communications in a mobile commerce system. They include various public TDMA protocols, the State of California Code of Regulation (CAL-TRAN) Title 21 (T21) protocol, and proprietary protocols. An example of the latter may be seen in U.S. Pat. No. 5,196,846 to Brockelsby et al. Various pre-defined protocols are discussed in US Pub. No. US2001/0050922, published Dec. 13, 2001 and owned in common with the present application.

The increased use of mobile commerce systems has lead to an increased risk of disclosure of confidential information and theft. A third party may intercept communications between a reader and a transponder and thereby obtain confidential information regarding the transponder and its user. The illicitly obtained information could include personal data, account information, credit card information, or other sensitive data. In some cases, a third party could make use of this illicitly obtained information to impersonate the user or conduct transactions at the user's expense. Another concern is that a third party could track a user's movements based upon the communications between a transponder and a reader.

Accordingly, it would be advantageous to prevent or discourage the interception of communications in a mobile commerce system.

A problem that arises with altering a mobile communication system to address the problem of intercepted communications is that such a mobile communication system typically has a pre-defined communication protocol and a large number of deployed transponders with existing customers. In larger systems, the number of deployed transponders may reach into the millions, making it impractical to deactivate all existing transponders and deploy new transponders in their place all at once. Changes to the system, in the form of new readers, new transponders, or other equipment, should be backward compatible to ensure that the previously deployed transponders continue to function normally within the system.

SUMMARY OF THE INVENTION

The present invention relates to mobile communications systems and provides a system and method for providing secure mobile commerce. In particular, the system and method of the present invention provide for secure mobile commerce by engaging in encrypted communications with a new set of transponders while continuing to accommodate unencrypted communications with an old set of transponders. A reader in the mobile commerce system is capable of distinguishing whether a transponder is from the old set or the new set and it adopts its communication format accordingly.

Encryption of data communicated between the reader and the transponder may be provided through a number of encryption schemes, including symmetric-key encryption protocols and asymmetric-key (i.e. public-key) encryption protocols. The encryption may also be implemented through a hybrid of these two protocols, e.g. through using public-key encryption to exchange secret keys so as to engage in symmetric-key encryption.

In one aspect, the present invention provides a method for secure mobile commerce within a mobile commerce system having a pre-defined communications protocol, the mobile commerce system including a plurality of readers and a plurality of transponders, the plurality of transponders including first transponders having an unencrypted communications format and second transponders having an encrypted communications format. The method includes steps of transmitting a trigger signal from one of and plurality of readers; receiving a response signal from one of and transponders; testing and response signal to determine whether and response signal is from one of and first transponders or one of and second transponders; engaging in unencrypted communications with and one of and transponders in accordance with the unencrypted communications format if and response signal was received from one of and first transponders; and engaging in encrypted communications with and one of and transponders in accordance with the encrypted communications format if and response signal was received from one of and second transponders.

In another aspect the present invention provides system for secure mobile commerce within a mobile commerce system having a pre-defined communications protocol. The system includes a reader, including a transmitter for transmitting a trigger signal and a program signal, and a receiver for receiving a response signal; and a plurality of transponders, each of the transponders including a transceiver for transmitting the response signal, and the transponders including first transponders having an unencrypted communications format and second transponders having an encrypted communications format. The reader includes a tag type analyzer coupled to the receiver for testing the response signal to determine whether the response signal is from one of the first transponders or one of the second transponders. The reader also includes a communications module for reading the response signal and generating the programming signal, wherein the communications module operates in accordance with the unencrypted communication format or the encrypted communications format in response to the tag type analyzer.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present invention, and in which:

FIGS. 1a and 1b show timing diagrams for pre-defined communications protocols for a mobile commerce system;

FIG. 2 shows a table detailing a transponder information data structure according to a pre-defined protocol;

Similar reference numerals are used in different figures to denote similar components.

DESCRIPTION OF SPECIFIC EMBODIMENTS

Figure 3:
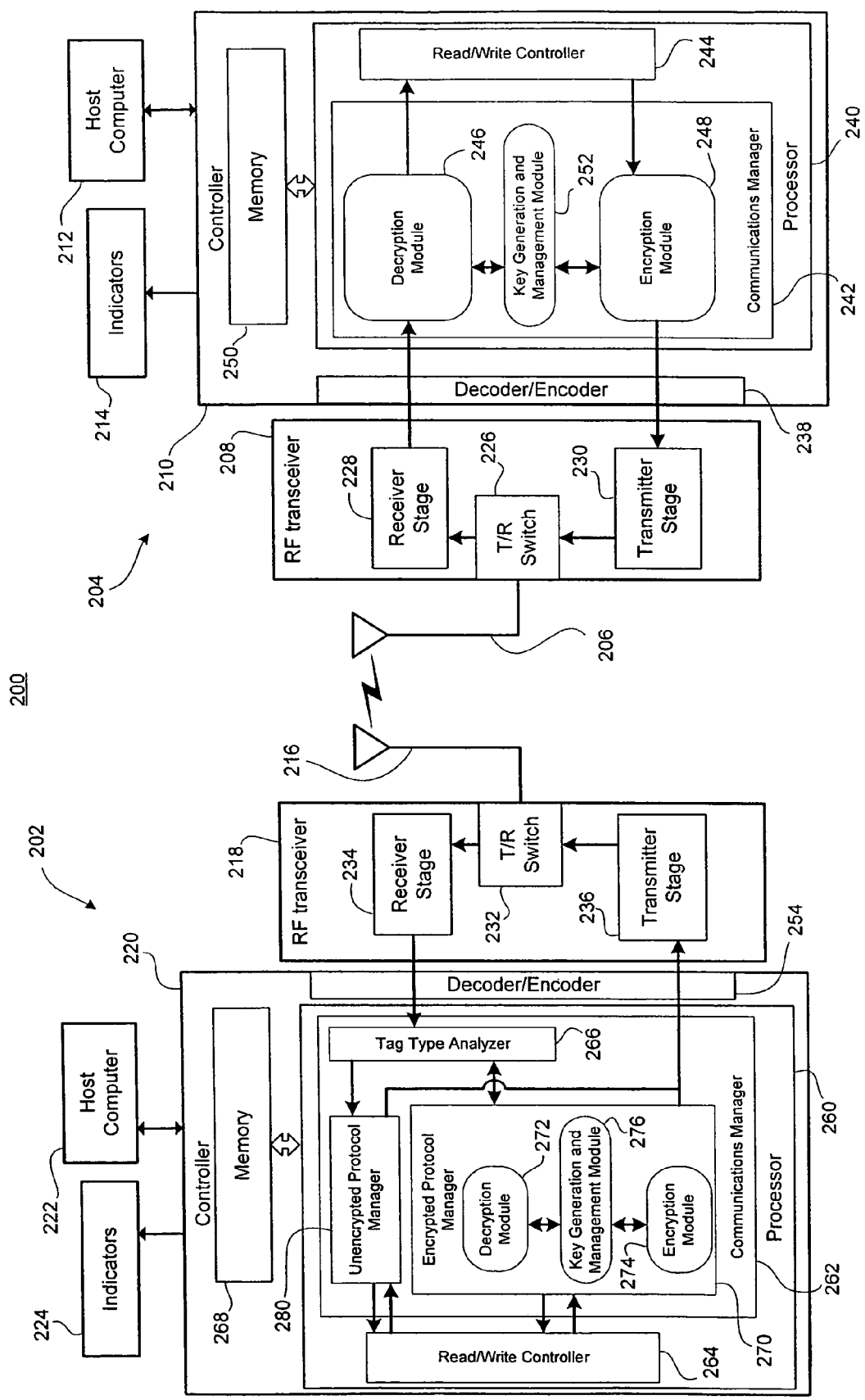
FIG. 3 shows, in block diagram form, an embodiment of a mobile commerce system in accordance with the present invention.

Although the following description may make reference to particular applications for mobile commerce technology, such as Electronic Toll and Traffic Management (ETTM), it will be understood that the present invention is not limited to this application.

Reference is first made to FIG. 1a, which shows a timing diagram 10 for a pre-defined communications protocol for a mobile commerce system. The mobile commerce system includes a reader and a transponder. The timing diagram 10 includes a trigger signal 12 transmitted by the reader to the transponder. In operation, the reader transmits a first trigger signal 12a and waits to see if a transponder in the vicinity responds to the first trigger signal 12a. Accordingly, there is a time-out period 14 specified in the protocol after which the reader may assume that there is no transponder in the vicinity of the reader's transmission range that has received the first trigger signal 12a. The protocol may further specify a guard band 16 following the trigger signal 12 and prior to the beginning of the time-out period 14 during which the transponder should not transmit a response.

It will be understood that the trigger signal 12 may be a number of pulses, such as a rectified square wave. In another embodiment, the trigger signal 12 may be a continuous wave RF transmission. Other possible trigger signals will be apparent to those of ordinary skill in the art.

In one embodiment, the trigger signal 12 has a duration of about 20 μs, the time-out period 14 has a duration of between 120 μs and 3 ms, and the guard band 16 has a duration of about 105 μs. In one embodiment, the transmissions between the reader and the transponder are at a carrier frequency of 915 MHz, modulated with 500 kHz data signals.

If no response signal is detected by the reader within the time-out period 14, then the reader may transmit a second trigger signal 12b. The reader may repeatedly transmit the trigger signal 12 until a response signal from a transponder is detected.

The timing diagram of FIG. 1a shows a response signal 18 detected by the reader in response to the second trigger signal 12b. The reader receives, demodulates, and reads the response signal 18. The response signal 18 contains transponder information stored in memory on the transponder, including the transponder ID, vehicle data, and account information.

In response to the transponder information, the reader may perform a number of operations in accordance with the functions of the mobile commerce system. For example, the reader may compare the account balance from the transponder with a toll amount in an ETTM application or with a purchase total in an automated retail payment system and may determine whether the transponder has sufficient funds to cover the expense. A deficiency in funds may result in generation of an alarm signal or message. The reader may debit the account balance by the amount of the transaction and generate a new account balance. The account balance on the transponder may be verified against an account balance stored in a remote central database coupled to the reader through a communications network. Alternatively, the transponder may not store any account details and the reader may obtain account or credit card information directly from a remote central database using the transponder ID information from the response signal. Other operations or functions performed by the reader in response to the transponder information in order to process a transaction within the mobile commerce system will be apparent to those of ordinary skill in the art.

Having performed its transaction-related functions or operations, the reader may update the transponder information and transmit instructions to the transponder directing it to update its locally stored transponder information. The timing diagram 10 shows a program signal 20 transmitted from the reader to the transponder. On receipt of the program signal 20, the transponder demodulates the signal to obtain program instructions, and it updates its locally stored transponder information in accordance with the program instructions.

In one embodiment, the response signal 18 has a duration of about 512 µs and the program signal 20 has a duration of about 512 µs. There may be a post-response guard band 19 during which neither the reader nor the transponder transmit. In one embodiment, the post-response guard band 19 has a duration of between 3 and 80 µs. Following the program signal 20, there may be a post-program guard band 21 to allow the transponder to update its locally stored transponder information in accordance with the program instructions before further action is taken. The post-program guard band may have a similar duration. It will be appreciated by those of ordinary skill in the art that the present invention is not limited to pre-defined protocols having the above-detailed characteristics or timing.

Following the programming of the transponder, the reader may transmit a third trigger signal 12c to re-read the transponder and verify that the locally stored transponder information has been updated correctly. In response to the third trigger signal 12c, the transponder again transmits a second response signal 22. The second response signal 22 contains the updated locally stored transponder information. On receipt of the second response signal 22, the reader demodulates it and verifies that the transmitted information corresponds to the program instructions issued by the reader.

The timing diagram 10 reflects a read-program-verify (RPV) cycle for the pre-defined communications protocol. It will be understood that not every transaction or communication between the reader and the transponder will necessarily require a full RPV cycle. In some circumstances, a read operation may be all that is required. In other circumstances, multiple RPV cycles may be required to complete a transaction sequence.

Another embodiment of a pre-defined communications protocol is illustrated in FIG. 1b, which shows a timing diagram 50 for another pre-defined communications protocol for a mobile commerce system. The timing diagram 50 may be used in conjunction with a mobile commerce system employing continuous wave backscatter transponders.

In this embodiment, the reader transmits a wakeup (trigger) signal 52 to the transponder. In one embodiment, the wakeup signal 52 comprises a series of pulses. It may comprise, for example, a series of ten Manchester encoded ones. The wakeup signal 52 is followed by a delay period 54. The delay period 54 allows the transponder time to activate its systems and prepare itself to receive data. In one embodiment, the delay period 54 comprises a delay of 100 µs±10%, during which the reader does not transmit RF signals.

Following the delay period 54, the reader transmits a polling message 56 followed by an end of message (EOM) frame 58. In one embodiment, the end of message frame comprises a period, such as 10 µs, immediately following the polling message, during which the reader ceases to transmit RF signals. It will be appreciated that the reader transmits the polling message 56 without knowing whether there are any transponders in range to receive its communications.

After further delay period 54, the transponder transmits its data (response) signal 60. The transponder transmits its data signal 60 by modulating and back-scattering RF. The transponder data signal 60 is followed by an end of message (EOM) frame 58. After another delay period 54, the reader may transmit an acknowledgement (program) signal (not shown).

Reference is now made to FIG. 2, which shows a table 100 detailing a transponder information data structure according to a pre-defined protocol. The pre-defined protocol specifies a data structure (also referred to as a data string) containing a plurality of fields. The data structure or string may be stored in memory within the transponder.

The data string contains three types of fields, as indicated under the table heading "Field Type": Factory fields, Agency fields, and Reader fields. The field type identifies the entity that is permitted to alter the contents of the particular field. The Factory fields are set by the manufacturer of the transponder and tend to relate to the characteristics of the transponder, i.e. the data in the Factory fields is read-only data. The Agency fields are fields that may be set by the agency deploying the transponders, and thus relate to vehicle or customer characteristics. The Reader fields are fields that may be altered by the individual readers in the mobile commerce system. In one embodiment, these are fields that are used to track the movement of the transponder within an electronic toll collection system. For example, the Reader fields include fields for recording entry and exit points and the time and dates of entry or exit. In other embodiments, the Reader fields may include account information which a reader verifies and then debits in an automatic parking system, automated drive-through retail outlet, or other mobile commerce system.

The table 100 shown in FIG. 2 contains a number of Factory fields, including a Header field 101, a Tag Type field 102, an Application ID 104, a Group ID 106, an Agency ID 108, and a serial number field 110. Because the Factory fields are set by the manufacturer, the content of the fields is well defined and predictable. For example, within the Tag Type field 102 and the Application ID field 104, there may be certain bit combinations that have not been used for known tags or applications. These bit combinations may be reserved for future use, as the categories of tags and applications develop and expand. The Tag Type field 102 may be used by the reader to distinguish between two or more different classes of transponders.

The Agency fields include a Vehicle Type field 112, a Vehicle Axles field 114, a Vehicle Weight field 116, a Revenue Type field 118, a Mounting location field 120, and an Agency Data field 122.

The Reader fields may include a set of timing fields 124 and a set of toll collection fields 126 that may be altered by a roadside reader. Within the toll collection fields 126, there may be an agency data field 130 provided as a 'scratch pad'. The last field in the data string illustrated by the table 100 is a Reader-class Error Check field 128 containing a 16-bit cyclic redundancy code (CRC). The Error Check field 128 is used by the reader to verify that data from the transponder has been received correctly.

From the table 100 in FIG. 2, it will be observed that the pre-defined protocol defines a data string containing 247 bits, including 47 bits in Factory fields, 47 bits for Agency fields, and 153 bits for Reader fields.

In operation, when a reader interrogates (i.e. triggers) a transponder, the transponder responds by transmitting a response signal containing the data string stored in local memory. In other words, the transponder sends the contents of its local memory to the reader. The reader then makes any modifications necessary to the Reader fields and transmits the modified data string back to the transponder. In one embodiment, the reader may not transmit the whole string, since many fields cannot be altered. The transponder receives a program signal containing the data string (or a portion of the data string) that includes the modified information. The transponder then stores the Reader fields from the program signal in place of the previous Reader fields in its local memory. The reader may then transmit a further trigger signal to re-read the transponder memory to verify that the transponder information has been updated in accordance with the modifications made by the reader.

The pre-defined protocol does not include a mechanism to prevent third parties from intercepting transmissions between the reader and the transponder. The communications channel for a mobile commerce protocol like the one described in FIGS. 1(a), 1(b) and 2 is typically an unsecured RF channel. Accordingly, a third party may easily intercept transmissions by being within the range of either the reader or transponder RF transmissions and tuning an antenna to the transmission frequency. The response signal or program signal may be obtained through demodulating the intercepted transmission. Once demodulated, the third party would have access to all of the information contained in the data string. In many mobile commerce applications this information may include sensitive or confidential information regarding the user and/or financial and account information, such as credit card numbers or account balance information. In addition, an unauthorized organization could track a user's movements based upon the communications between the user's transponder and readers.

Accordingly, in one aspect the present invention provides for encrypted communications between a reader and a transponder in a mobile commerce system. The encryption may take many forms, including symmetric-key encryption and asymmetric-key (i.e. public-key) encryption.

A problem that arises with altering a mobile communication system to address the problem of intercepted communications is that such a mobile communication system typically has a pre-defined communication protocol, for example the pre-defined communication protocol described in connection with FIGS. 1 and 2, and a large number of deployed transponders with existing customers. In large systems, the number of deployed transponders may reach into the millions, making it impractical to deactivate all existing transponders and deploy new transponders in their place. Accordingly, alterations or improvements to the mobile communications system to provide transponders and readers enabled for encrypted communications in accordance with the present invention do not prevent deployed transponders from successfully operating using unencrypted communications. In other words, one aspect of the present invention is that the improved mobile commerce system is backward compatible with transponders using a pre-defined unencrypted communications protocol.

To provide the mobile commerce system with backward compatibility, the present invention provides a reader having the capability of distinguishing between transmissions from an old transponder and transmission from a new transponder, wherein the old transponders employ an unencrypted communications format in accordance with the pre-defined communications protocol, and the new transponders employ an encrypted communications format in accordance with the pre-defined communications protocol. In one embodiment, the reader interrogates the transponders and the transponders reply with a response signal. The old transponders transmit a response signal containing an unencrypted data string, such as described in connection with FIG. 2. The new transponders transmit a response signal which the reader recognizes as an encrypted communication.

In one embodiment, the reader transmits a partially encrypted data string having an unencrypted portion that includes a tag type indicator. In one embodiment, the tag type indicator comprises a tag type field within the format of the data string according to the pre-defined protocol. The response transmitted by the new transponders may contain additional data, which may be encrypted. For example, with reference to FIG. 2, the response of a new transponder may include the Factory fields in an unencrypted form and the remaining fields in an encrypted form. In another embodiment, the response of a new transponder may include some of the Factory fields in an unencrypted form and no additional data, i.e. the response may simply indicate the tag type. In yet another embodiment, the response of a new transponder may include at least the tag type field in an unencrypted form, and a portion of the response may be used to facilitate key management and exchange for setting up the encrypted communications between the reader and the transponder. Further details of specific embodiments of a response signal, including response signals to facilitate key exchange, are given below.

In another embodiment, the reader distinguishes encrypted communications from unencrypted communications by performing decryption of the received communication and then performing a data integrity check of the received communication and the decrypted received communication. If the response is encrypted, then only the decrypted received communication will pass the data integrity check; if the response is not encrypted, then only the originally received communication will pass the data integrity check. In one embodiment, the data integrity check may be performed by evaluating the Error Check field 128 (FIG. 2), e.g., a CRC check.

Reference is now made to FIG. 3, which shows, in block diagram form, an embodiment of a mobile commerce system 200 in accordance with the present invention. The mobile commerce system 200 includes a reader 202 and a transponder 204. The transponder 204 comprises an antenna 206, an RF transceiver 208, and a digital controller 210. An optional host computer 212 and indicators 214 are also shown coupled to the controller 210. The optional host computer 212 may perform a variety of functions such as memory storage or transaction protocol support. The host computer 212 may provide an interface to other devices such as smart cards, digital recording devices, display devices or the like (not shown). The indicators 214 may provide the vehicle operator with a visual or auditory signal. The indicators 214 may include light emitting diodes, a display screen, a speaker, or other output devices. The signals output through the indicators 214 may provide the vehicle operator with information regarding the mobile commerce transaction, such as a success indicator, an insufficient funds indicator, or other indicators of account status or required tasks.

The reader 202 comprises an antenna 216, an RF transceiver 218, and a digital controller 220. The reader 202 is shown with its controller 220 coupled to an optional host computer 222 and to an output device 214. The output device 214 may include a display screen, printer, or any other such device. The host computer 222 may provide the reader 202 with transaction protocol support, including account management and transaction details. The host computer 222 may also connect the reader 202 with remote computers through a communications network, such as the Internet. Accordingly, the reader 202 may be able to read and update remote databases containing information regarding the transponder 204, including user information, account information, or transaction information.

In one embodiment, the antennas 206, 216 act in both a receive mode and a transmit mode for RF radiated energy. In the receive mode, each antenna 206, 216 receives and converts radiated energy to a RF voltage signal. In the transmit mode, the antennas 206, 216 convert an RF voltage signal to radiated energy. The transponder 204 shown in FIG. 3 is an "active" transmitter, meaning that the RF transceiver 208 generates the RF voltage signal under the control of the controller 210. In an alternative embodiment (not shown), the antenna 206 may be controlled to modulate a continuous wave transmitted by the reader antenna 216 in a modulated backscatter implementation.

The RF transceivers 208, 218 each include a transmit/receive (T/R) switch 226, 232 coupled to the respective antennas 206, 216. The RF transceivers 208, 218 also each include a receiver stage 228, 234 and a transmitter stage 230, 236. In a receive mode, the T/R switch 226, 232 routes RF voltage signals from the antenna 206, 216 to the respective receiver stage 228, 234. In a transmit mode, the T/R switch 226, 232 routes RF voltage signals generated through the transmitter stage 230, 236 to the antenna 206, 216. Operation of the T/R switches 226, 232 is controlled in accordance with the pre-defined communications protocol by the digital controller 210, 220. The receiver stages 228, 234 detect receipt of a signal by the antenna 206, 216 and demodulate the signal to output a demodulated baseband signal. The transmitter stages 230, 236 receive a baseband coded signal from the controller 210, 220 and generate an RF voltage signal modulated using the baseband coded signal. The various amplifiers, filters, threshold detectors and other components that may be included in the receiver stages 228, 234 and/or the transmitter stages 230, 236 will be familiar to those of ordinary skill in the art.

Each digital controller 210, 220 may comprise one or more logic devices, including, for example, a microcontroller or an application specific integrated circuit (ASIC), and are suitably programmed to control the respective RF transceiver 218, 208 and to receive and generate communications in accordance with a pre-defined communications protocol. As discussed in greater detail below, the reader controller 220 includes structure and modules to enable it to distinguish between signals from a transponder using unencrypted data and a transponder using encrypted data, and to engage in either unencrypted and encrypted communications with the transponders depending on the type of transponder detected.

The transponder digital controller 210 may include an integral encoder/decoder 238 coupled to its input and output ports. The encoder/decoder 238 converts input analog signals from the RF transceiver 208 to digital signals for the controller 210 and converts output digital signals from the controller 210 to analog signal for the RF transceiver 208. Those of ordinary skill in the art will appreciate that the encoder/decoder 238 may be separate from the controller 210 and/or may be integrated as a part of the RF transceiver 208.

The transponder digital controller 210 includes a processor 240 and a memory 250. The memory 250 may provide long-term storage of data, including a data string structured in accordance with the pre-defined communications protocol and including transponder-specific data. The format of the data string may, in one embodiment, be structured as shown in the table 100 of FIG. 2. The memory 250 may also store program instructions for controlling operation of the processor 240. The program instructions may be executed by the processor 240 to implement the modules and/or operations and functions described herein.

The processor 240 includes a communications manager 242 and a read/write controller 244. The communications manager 242 implements the communications protocol utilized by the transponder 204. The read/write controller 244 reads the data string from the memory 250 in order to output the data string to the communications manager 242 for transmission to the reader 202. It also writes new or updated data to the memory 250, as instructed by the reader 202.

The communications manager 242 includes a decryption module 246, an encryption module 248, and a key generation and management module 252. The communications manager 242 functions to decrypt incoming bit level data from the reader 202 and to encrypt outgoing bit data from the read/write controller 244. The decryption module 246 receives incoming data from the RF transceiver 208 through the encoder/decoder 238 and applies the appropriate decryption protocol. The decryption module 246 outputs decrypted data to the read/write controller 244. The encryption module 248 receives data strings from the read/write controller 244, such as the transponder information data string stored in memory 250, and it encrypts the data string, wholly or partially, before outputting the encrypted data string to the RF transceiver 208 through the encoder/decoder 238. The key generation and management module 252 generates transponder encryption key(s), stores keys received from the reader 202, manages key exchange protocols, and performs other tasks associated with the selected encryption protocol, including any authentication protocols. Further details regarding the functions and/or operation of the decryption module 246, the encryption module 248, and the key generation and management module 252 in connection with particular embodiments employing particular encryption protocols are given below.

The reader digital controller 220 may include an integral encoder/decoder 254 coupled to its input and output ports. The encoder/decoder 254 decodes input analog signals from the RF transceiver 218 to digital signals for the controller 220 and encodes output digital signals from the controller 220 to analog signal for the RF transceiver 218. Those of ordinary skill in the art will appreciate that the encoder/decoder 254 may be separate from the controller 220 and/or may be integrated as a part of the RF transceiver 218.

The reader controller 220 comprises a memory 268 and a processor 260. The memory 268 may provide long-term storage of data, including program instructions for controlling operation of the processor 260. The program instructions may be executed by the processor 260 to implement the modules and/or operations and functions described herein. The memory 268 may also provide temporary or persistent storage of transponder information, transaction information, or other data relating to mobile commerce transactions.

The processor 260 includes a communications manager 262 and a read/write controller 264. The communications manager 262 implements the pre-defined communications protocol to be used in communicating with transponders. The reader 202 may be used to communicate with a number of transponders. Transponders used within the mobile communications system 200 may belong to a first type or a second type. Transponders of the first type (not shown) send and receive data in an unencrypted form. Transponders in the second type, such as the transponder 204, send and receive data in an encrypted form. Both the unencrypted and encrypted communications may be formatted in accordance with the pre-defined communications protocol. Accordingly, for each transponder the communications manager 262 selects from an unencrypted communications form and an encrypted communications form.

In one embodiment, the communications manager 262 includes a tag type analyzer 266. The tag type analyzer 266 receives input data from the receiver stage 234 via the encoder/decoder 254. The input data is the demodulated information obtained by the receiver stage 234 from demodulating received RF voltage signals from the antenna 216. Transmissions from the transponder 204 may provide input data comprising at least a portion of the data string stored in transponder memory 230, which includes a tag type indicator. In one embodiment, the tag type indicator comprises the tag type field 102 (FIG. 2). The tag type analyzer 266 reads the tag type indicator, i.e. the tag type field 102. Based upon the tag type indicator, the tag type analyzer 266 determines whether the input data has been received from a transponder of the first type or a transponder of the second type. The communication manager 262 may then route the input data according to the type of transponder detected.

In another embodiment, the tag type analyzer 266 receives both the input data from the RF transceiver 218 and decrypted input data from an encrypted protocol manager 270, which is described in detail below. The tag type analyzer 266 performs a data integrity check on the input data and upon the decrypted input data. Based upon the results of the data integrity check, the tag type analyzer 266 determines whether the input data has been received from a transponder of the first type or a transponder of the second type. The communication manager 262 may then route the input data according to the type of transponder detected.

The communication manager 262 includes an unencrypted protocol manager 280 and an encrypted protocol manager 270. The communications manager 262 may pass incoming input data from the RF transceiver 218 to either the encrypted protocol manager 270 or the unencrypted protocol manager 280, in accordance with the transponder type indicated by the tag type analyzer 266. In another embodiment, the encrypted protocol manager 270 and the unencrypted protocol manager 280 each receive the input data and the tag type analyzer 266 later determines whether the input data was encrypted or not.

Input data received by the unencrypted protocol manager 280 is processed in accordance with the pre-defined communications protocol and output to the read/write controller 264. Input data received by the encrypted protocol manager 270 is also processed in accordance with the pre-defined communications protocol, but in addition, the encrypted protocol manager 270 implements an encryption protocol.

The encrypted protocol manager 270 includes a decryption module 272, an encryption module 274, and a key generation and management module 276. The decryption module 272 receives incoming input data from the encoder/decoder 254 and applies the appropriate decryption protocol to the encrypted portion of the input data. The decryption module 272 outputs decrypted data to the read/write controller 264. The encryption module 274 receives output data from the read/write controller 264, such as a programming signal, which may include an updated transponder information data string to be stored by the transponder 204 in memory 250. The encryption module 274 encrypts the output data before outputting the encrypted output data to the encoder/decoder 254. The encryption module 274 may encrypt a portion of the output data or all of the output data.

The key generation and management module 276 generates reader encryption key(s), stores keys received from the transponder 204, manages key exchange protocols, and performs other tasks associated with the selected encryption protocol, including any authentication protocols. Further details regarding the functions and/or operation of the decryption module 272, the encryption module 274, and the key generation and management module 276 in connection with particular embodiments employing particular encryption protocols are given below.

The read/write controller 264 receives unencrypted input data from the unencrypted protocol manager 280 or from the encrypted protocol manager 270, depending upon the transponder type, and provides output data to either the unencrypted protocol manager 280 or the encrypted protocol manager 270, depending upon the transponder type. The read/write controller 264 may, alone or in conjunction with the optional host computer 222 or any other remote systems or computers, calculate debits, account changes, or other transaction details and determine corresponding changes to the transaction information stored by the transponder 204. The read/write controller 264 may also verify, based on the transaction information, that sufficient funds are available, or that other requirements are met to proceed with a transaction.

Figure 4A:
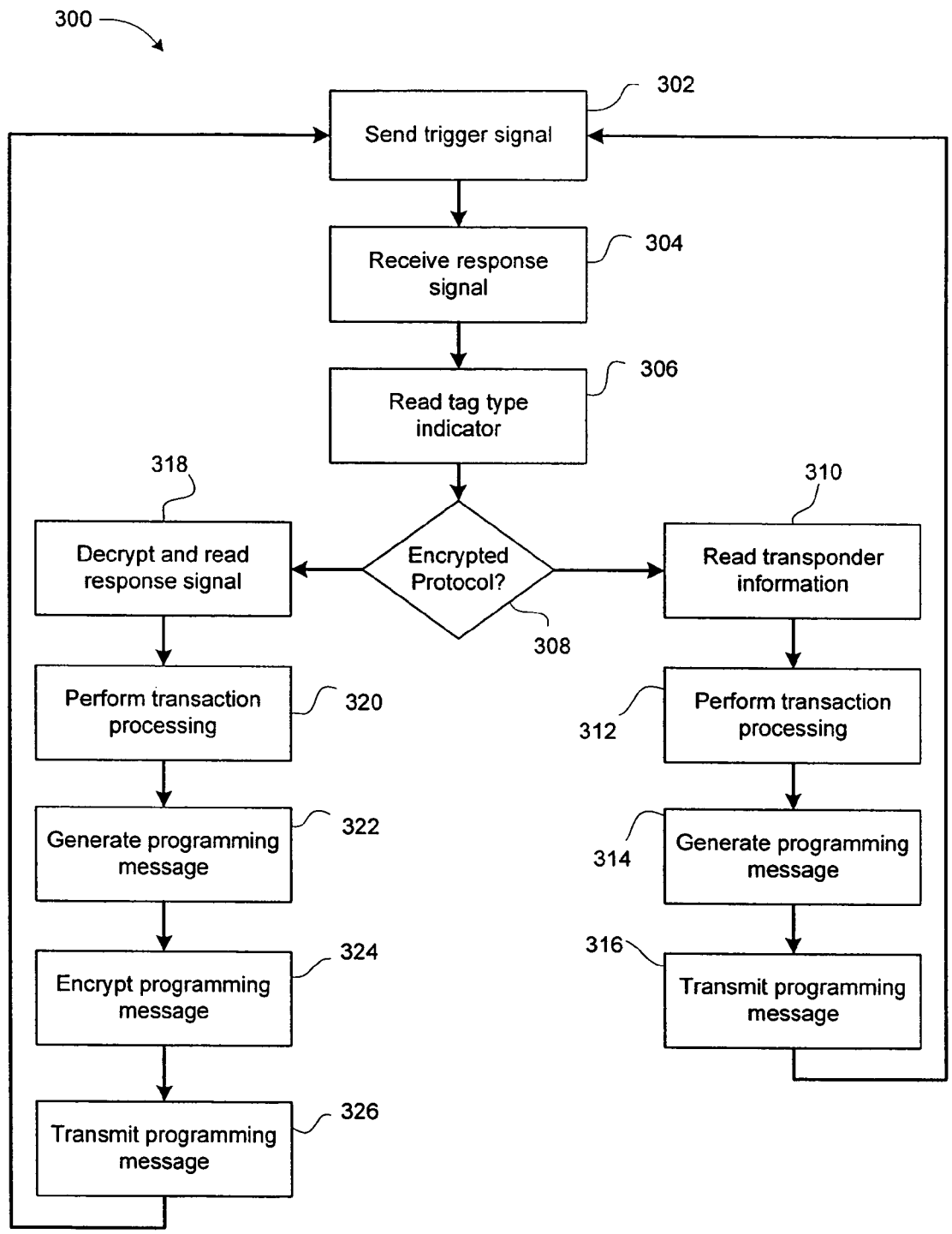
FIG. 4a shows, in flowchart form, an embodiment of a method for secure mobile commerce within a mobile commerce system having a pre-defined communications protocol.
Figure 4B:
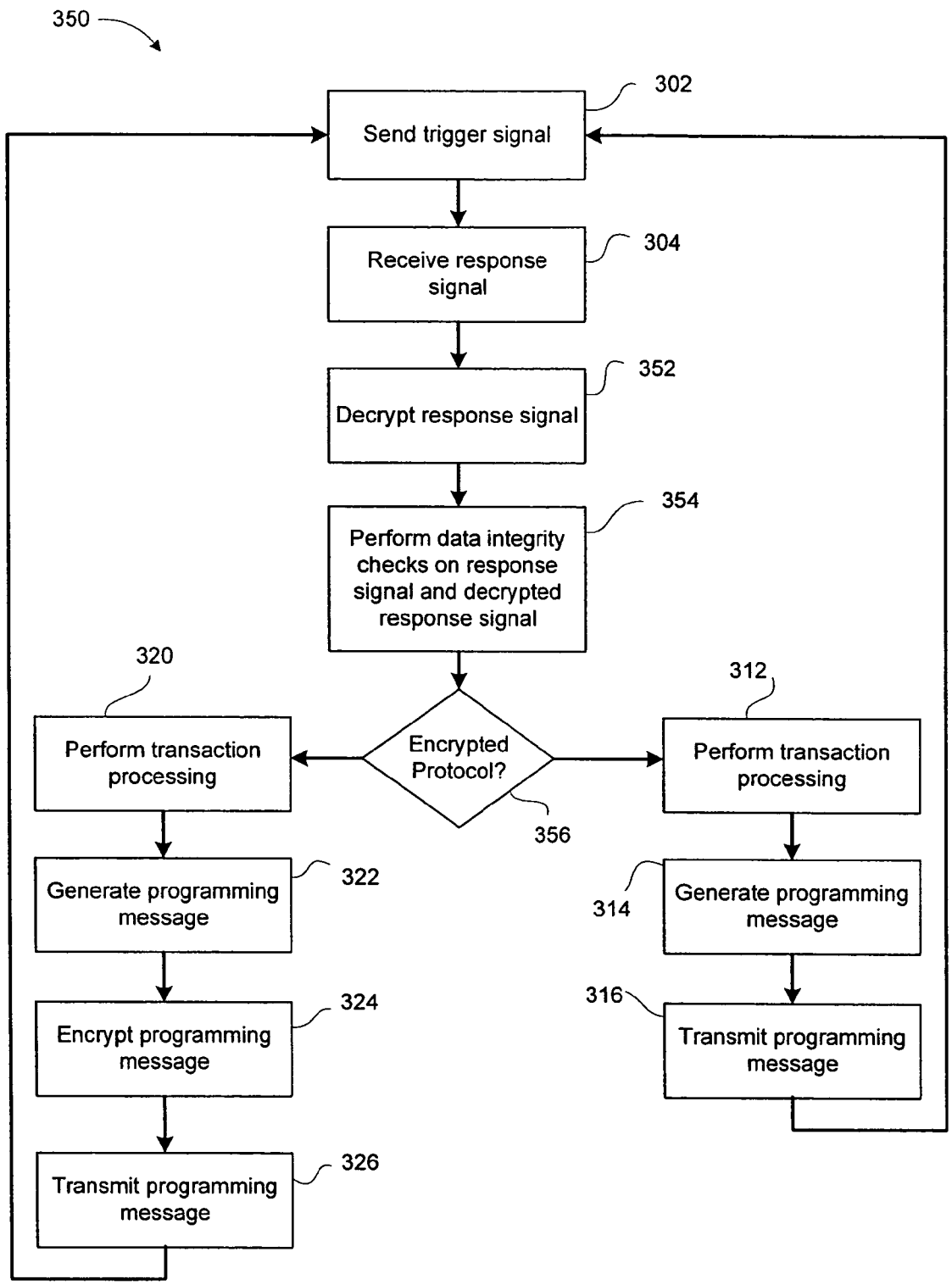
FIG. 4b shows, in flowchart form, another embodiment of a method for secure mobile commerce within a mobile commerce system having a pre-defined communications protocol.

Reference is now made to FIGS. 4a and 4b, in conjunction with FIG. 3. FIG. 4a shows, in flowchart form, a first embodiment of a method 300 for secure mobile commerce within a mobile commerce system 200 having a pre-defined communications protocol. The method 300 begins in step 302 with the transmission of a trigger signal by the reader 202. In step 304, the reader 202 receives a response signal from a transponder in reply to the trigger signal. The reader antenna 216 couples the electromagnetic response signal and outputs an RF voltage response signal, which is receives by the reader receiver stage 234. After performing any amplification, thresholding, or other operations, as will be understood by those of ordinary skill in the art and as may be defined by the pre-defined communications protocol, the receiver stage 234 sends an input signal to the reader controller 220. Specifically, the input signal is decoded by the encoder/decoder 254 and is received by the communications manager 262.

In step 306, the tag type analyzer 266 reads a tag type indicator contained within the input signal. In one embodiment, the tag type indicator is a bit field within the input signal and the content of the bit field indicates whether the response signal was generated by a transponder of the first type or the second type. The tag type analyzer 266 may mask the input data, parse the input data, or otherwise process the input data to generate an indication of the transponder type based upon the tag type indicator. Having read the tag type indicator, in step 308, the tag type analyzer 266 makes a routing decision based upon the transponder type. If the transponder is of the first type (i.e. unencrypted communications format) then the method 300 proceeds to step 310. If the transponder is of the second type (i.e. encrypted communications format) then the method 300 proceeds to step 318.

In step 310, the unencrypted protocol manager 280 performs any signal processing operations normally associated with the pre-defined communications protocol. This may include CRC check, parsing data, and other such operations. It then sends the processed input data to the read/write controller 264, which reads the transponder information.

In step 312, the read/write controller 264 performs transaction processing. These steps may include debiting accounts, charging credit cards, etc., and may include interacting with the host computer 222 or remote systems or databases. The range of operations or functions that may be included within the scope of "transaction processing" will be apparent to those of ordinary skill in the art.

After step 312, the read/write controller 264 may generate a programming message in step 314 to update the transponder information that was received by the reader 202 from the transponder in the response signal. The programming message may include changes to the transponder information such as a new account balance, a change in the 'reader ID' field, etc. The programming message is sent from the read/write controller 264 to the communications manager 262, in particular to the unencrypted protocol manager 280, where the programming message is formatted and/or prepared in accordance with the pre-defined communications protocol. It is then output to the RF transceiver 218 through the encoder/decoder 254. In step 316, the programming message is transmitted to the transponder by the RF transceiver 218 via the reader antenna 216.

If the tag type analyzer 266 determines from the tag type indicator that the response signal was received from a transponder of the second type, then the input signal is routed to the encrypted protocol manager 270. The encrypted protocol manager 270 includes the decryption module 272, which, in conjunction with the key generation and management module 276, decrypt the input signal and send the decrypted input data to the read/write controller 264. The read/write controller 264 reads the transponder information from the decrypted input data.

In step 320, the read/write controller 264 performs transaction processing. These steps may include debiting accounts, charging credit cards, etc., and may include interacting with the host computer 222 or remote systems or databases. The range of operations or functions that may be included within the scope of "transaction processing" will be apparent to those of ordinary skill in the art.

After step 320, the read/write controller 264 may generate a programming message in step 322 to update the transponder information that was received by the reader 202 from the transponder in the response signal. The programming message may include changes to the transponder information such as a new account balance, a change in the 'reader ID' field, etc. The programming message is sent from the read/write controller 264 to the communications manager 262, in particular to the encrypted protocol manager 270. The encryption module 274, in conjunction with the key generation and management module 276, encrypts the programming message in step 324. In step 326, the encrypted programming message is transmitted to the transponder by the RF transceiver 218 via the reader antenna 216.

Those of ordinary skill in the art will appreciate that many of the described functions and operations for implementing the method 300 may be performed using a programmable logic device or an ASIC operating under program control, which may be stored in persistent memory, e.g. firmware, or otherwise. The suitable programming of such a device will be within the understanding of such persons having regard to this specification.

FIG. 4b shows, in flowchart form, a second embodiment of a method 350 for secure mobile commerce within a mobile commerce system 200 having a pre-defined communications protocol.

The method 350 begins with sending a trigger signal (or wakeup signal) in step 302 and receiving a response in step 304. It will be understood that in some embodiments, for example with a pre-defined communications protocol similar to the protocol described in conjunction with FIG. 1b, the reader may transmit a polling message between steps 302 and 304.

Following receipt of the response signal, the reader decrypts the response signal in step 352. Note that this step occurs prior to determining whether or not the response was received from a transponder of the first type or the second type. Accordingly, the response signal may or may not be encrypted.

In step 354, data integrity checks are performed upon the response signal and the decrypted response signal. In step 356, the reader determines whether the response signal came from a transponder of the first or second type based upon the results of the data integrity checks. For example, the reader may evaluate the CRC field. If the response signal is not encrypted, then this data integrity check will only prove valid for the received response signal and not for the 'decrypted' response signal. Similarly, if the response signal is encrypted, then the data integrity check will only be successful for the decrypted response signal and not for the received response signal. It will be appreciated that steps 354 and 356 may be combined and performed in parallel or in series. In other words, the data integrity checks may be performed upon both signals and then evaluated, or a data integrity check may be performed upon the response signal, and then if the check fails the data integrity check may be performed upon the decrypted response signal.

Furthermore, it will be appreciated that steps 352, 354, and 356 may be combined such that the data integrity check is performed upon the response signal prior to performing decryption. The decryption step 352 may be performed only if the data integrity check of the response signal fails. Following decryption, the data integrity check of the decrypted signal may be performed to ensure that the received response signal is an encrypted signal.

The present invention may employ a variety of cryptographic techniques, provided the technique does not compromise the backward compatibility provided as heretofore described. Cryptographic techniques may generally be divided into symmetric-key encryption and public-key encryption. The present invention may employ either type of encryption and various key exchange and management techniques, and example embodiments are provided below.

Figure 5:
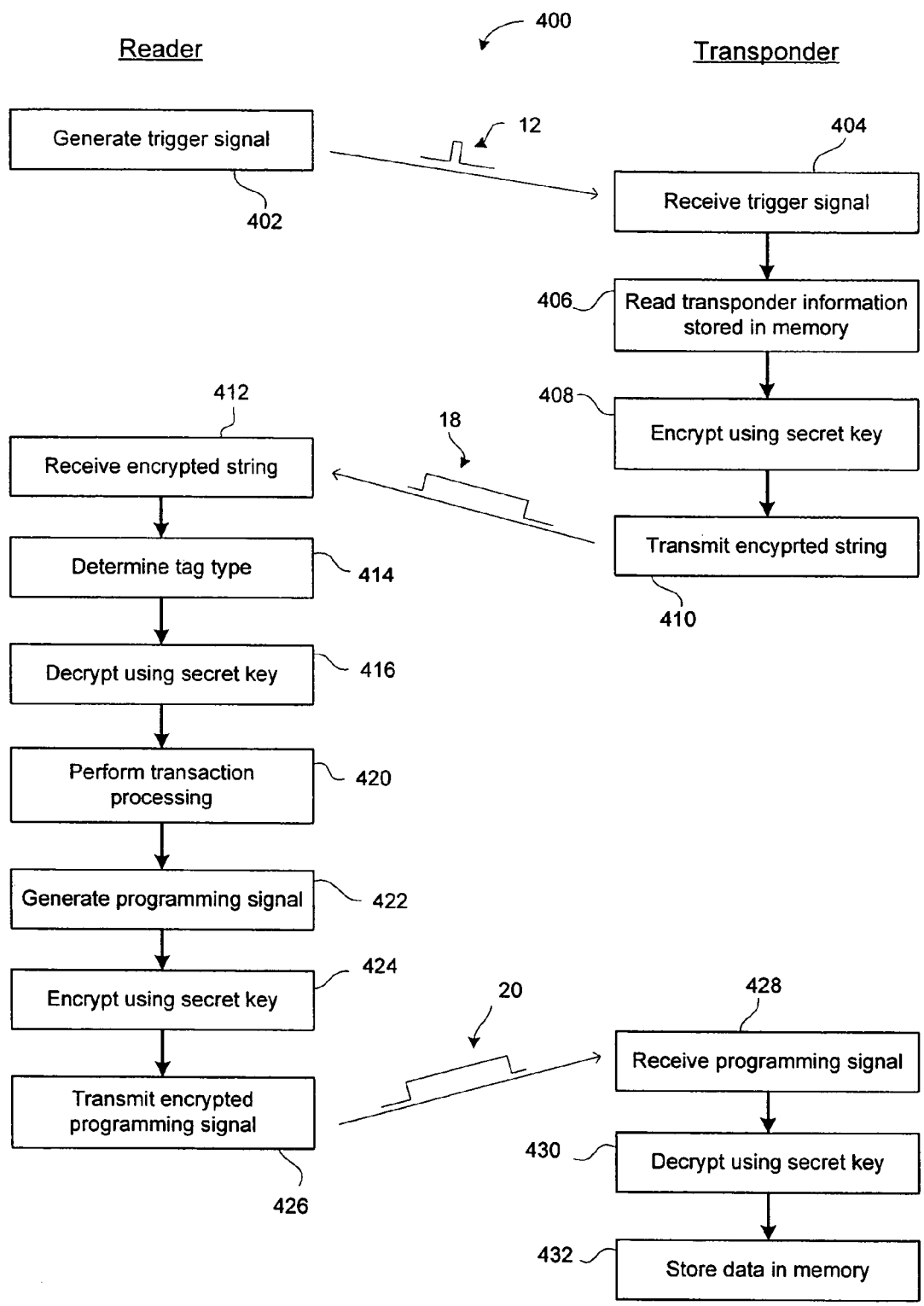
FIG. 5 diagrammatically illustrates a first method for providing encrypted communications within a mobile commerce system having a pre-defined communications protocol.

Reference is now made to FIG. 5, which diagrammatically illustrates a first method 400 for providing encrypted communications within a mobile commerce system having a pre-defined communications protocol. The method 400 includes steps performed by a reader and by a transponder. Steps performed by the reader are indicated on the left half of the diagram under the heading "Reader". Steps performed by the transponder are indicated on the right half of the diagram under the heading "Transponder".

In one embodiment, the pre-defined communications protocol is a communications protocol having a format similar to the format described in connection with FIG. 1. Such a format includes the propagation of a trigger signal from a reader to any transponders present in the transmission range. A transponder receiving the trigger signal responds with a response signal, which includes transponder information extracted from a transponder memory. The reader receives the response signal and may send a programming signal to the transponder to update the transponder information. The reader may then send a further trigger signal to obtain a response signal that reflects the updated transponder information. A pre-defined communications protocol having this format may be referred to as having a read-program-verify (RPV) cycle. It will be understood that the format does not require a programming step or a verification step for each read.

The method 400 employs symmetric-key encryption. Symmetric encryption is a cryptographic technique wherein it is computationally easy to determine one key from the other key in a key pair. In most symmetric encryption schemes, the keys are identical. Symmetric encryption relies upon the secrecy of the keys. Accordingly, the key pair is distributed securely, and not over unsecured channels. In one embodiment, every reader and every transponder use the same secret key for communications. In another embodiment, the readers have access to a large lookup table of indexed keys and groups of transponders have sub-sets of this lookup table stored upon them. An individual transponder chooses a key from the sub-set lookup table and the reader chooses the same key from the large lookup table. The transponder and reader may base their choice upon a shared random index number. The random index number may, for example, be, or may be based upon, the last transaction time or the last transaction identification number. Other methods may be used to provide a key for use by the reader and transponder in symmetric-key encryption.

The method begins in step 402 with the generation of a trigger signal 12 (FIG. 1a) by the reader. The trigger signal 12 is propagated to the transponder where it is received in step 404. In step 406, the transponder reads its transponder information from local memory. The transponder then encrypts its transponder information in step 408. The transponder may not encrypt all of its transponder information. In fact, in an embodiment where the tag type indicator is a field of data within the transponder information, such as the tag type field 102 (FIG. 2), the transponder does not encrypt this field. This field remains unencrypted so that the reader can identify that the response signal originated from a particular tag type. In one embodiment, the transponder encrypts a portion of the fields, such as, for example, the Factory fields, or the Agency and Factory fields.

The transponder encrypts the data in step 408 using its secret key. The precise transformation or function used to convert the data to encrypted data may include a wide range of cryptographic transformations or functions. Those of ordinary skill in the art will appreciate that a wide range of such transformations or functions are known and may be selected, keeping in mind the processing power and time constraints of a particular mobile communications system.

In step 410, the transponder transmits the encrypted string of data to the reader in the format of the response signal 18 (FIG. 1a). The reader receives the response signal 18 in step 412 and determines the tag type in step 414. In one embodiment, a tag type indicator notifies the reader that the transponder uses an encrypted format, and the input response signal is routed accordingly. In another embodiment, a data integrity check is performed to determine if the received response signal 18 is encrypted or decrypted. In step 416 the response data is decrypted using the secret key and the decryption transformation corresponding to the encryption transformation used by the transponder. It will be appreciated that in some embodiments, step 416 may occur prior to step 414, i.e., where the decryption is performed prior to performing a data integrity check on the decrypted string.

In steps 420 and 422, the reader performs transaction processing and generates a programming data. The reader then encrypts the programming data using the secret key in step 424. In step 426, the encrypted programming data is transmitted to the transponder in the format of the program signal 20 (FIG. 1a).

The transponder receives the program signal 20 in step 428 and decrypts it in step 430 to obtain the programming data. Based upon the programming data, in step 434 the transponder updates its transponder information stored in memory.

It will be appreciated that no key exchange is necessary within the symmetric-key method 400 since the reader and the transponder already know the secret key or can obtain it relatively easily based upon the identity of the transponder/reader with which it is in communication.

Figure 6:
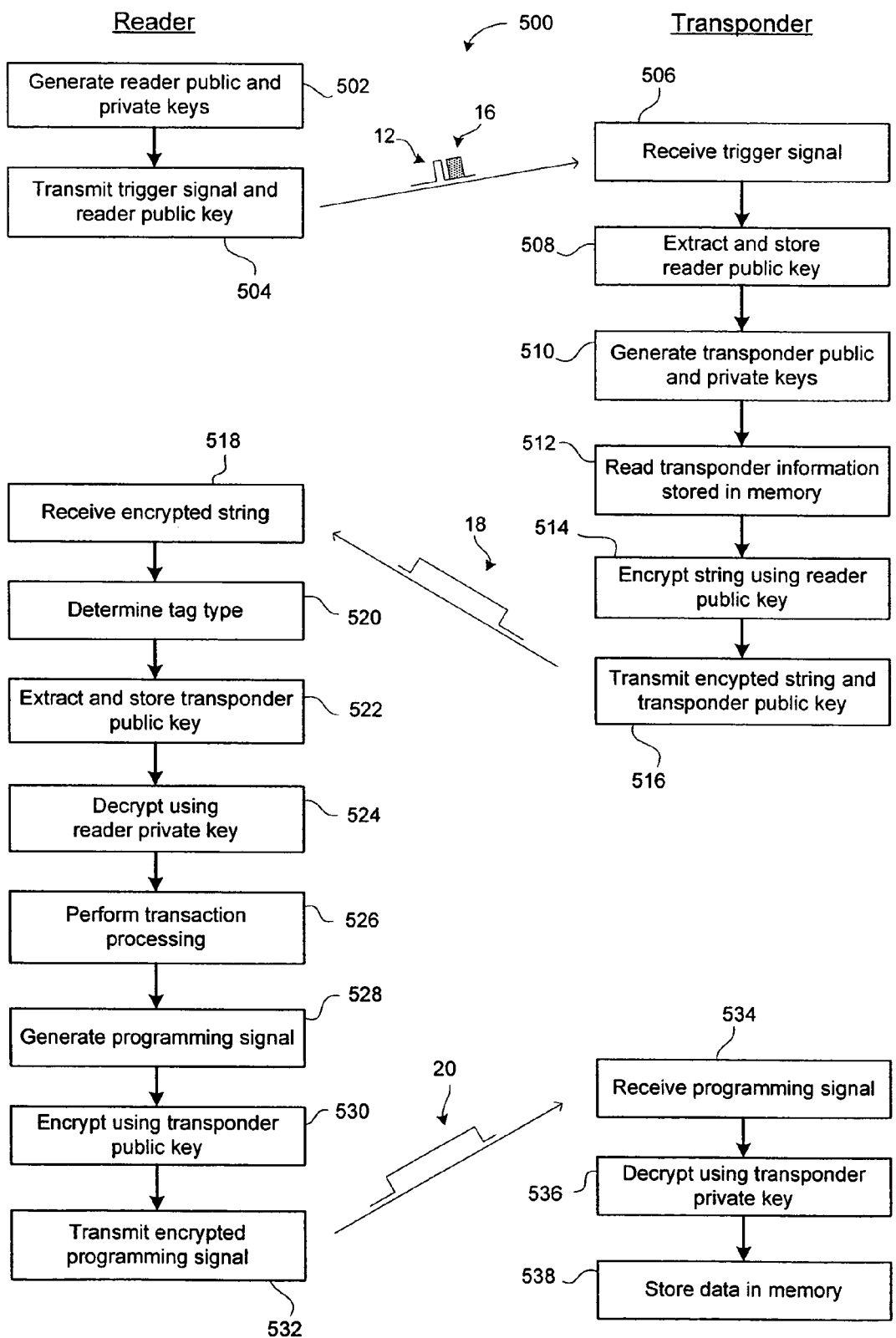
FIG. 6 diagrammatically illustrates a second method for providing encrypted communications within a mobile commerce system having a pre-defined communications protocol.

Reference is now made to FIG. 6, which diagrammatically illustrates a second method 500 for providing encrypted communications within a mobile commerce system having the pre-defined communications protocol. The method 500 employs a public-key encryption protocol. Public-key encryption is a cryptographic technique having an encryption transformation and decryption transformation, wherein it is computationally infeasible to determine the decryption transformation based upon the encryption transformation. In other words, the encryption transformation is a trapdoor one-way function that provides a cipher text. Knowing the cipher text and the encryption key, one cannot determine the decryption key and thereby obtain the message.

Public-key encryption functions by having each party generate a key pair: a public and a private key. Each party distributes its public key so as to allow other parties to encrypt messages with the public key. If a message is encrypted using the public key, only the party holding the corresponding private key will be capable of decrypting and reading the message.

The method 500 begins in step 502 wherein the reader generates a reader public key $E_r$ and a reader private key $D_r$. In step 504 the reader transmits a trigger (or wakeup) signal 12 (FIG. 1a) and the reader public key $E_r$.

In one embodiment, for example using the pre-defined communications protocol shown in FIG. 1a, the reader may incorporate the reader public key $E_r$ either into a "beacon" signal 17 (FIG. 1a) or within the trigger signal 12 itself. The "beacon" signal 17 is an encoded signal inserted into the guard band 16 or time out period 14 following the trigger signal 12. In order to incorporate the reader public key $E_r$ into the trigger signal 12 itself, the reader may encode the trigger pulse or series of pulses with data at a higher rate, such as 1 MHz or higher. In one embodiment, the trigger signal 12 is a pulse or a series of pulses having a duration of about 20 µs. The transponder may extract the encoded data and still recognize the trigger pulse with appropriate filtering, as will be understood by those of ordinary skill in the art.

In another embodiment, the reader may send the reader public key $E_r$ as a "beacon" signal 17 after sending the trigger signal 12, but before a transponder response signal 18 may be expected from a transponder of the first or second type, i.e. during the guard band 16.

In another embodiment, for example using the pre-defined communications protocol shown in FIG. 1b, the reader may send an early wakeup (or trigger) signal 70 (FIG. 1b). The early wakeup (or trigger) signal 70 is sent prior to the standard wakeup signal 52 prescribed by the predefined protocol. The early wakeup signal 70 is followed by a delay period 72 to allow the transponders to wake up and ready themselves to receive further communications. The reader then sends a key information signal 74. The key information signal 74 is intended for key exchange or management with the second type of transponders. If a transponder of the first type receives the key information signal 74, it will not comprehend the message and will ignore it. A transponder of the second type will recognize that it has received a key information signal 74 and it will handle it accordingly. Following the key information signal, there is an end of message frame 58 to allow the transponders to return to a sleep state in preparation for the upcoming wakeup signal 52.

In an alternative embodiment, the key information signal 74 is sent from the transponders of the second type to the reader, instead of from the reader to the transponders. This embodiment allows the readers to receive transponder key information prior to beginning of the normal pre-defined communication sequence, which will enable the readers to send encrypted communications with the polling message 56 based on receipt of a transponder public key in the key information signal 74. Transponders of the first type would not be capable of sending the key information signal 74 in response to receipt of the early wakeup signal 70.

In yet another embodiment, the reader public key or the transponder public key is sent using a key beacon signal 76 following the standard wakeup signal 52 but before the polling message 56, i.e. during the delay period 54.

Irrespective of how the reader public key $E_r$ is incorporated into or associated with the trigger signal 12, in step 506 the transponder receives the trigger signal 12 and the reader public key $E_r$, which is extracted from either the trigger signal 12 or the beacon signal 17 (or the key information signal 74, or the key beacon signal 76, etc.) and stored in memory in step 508.

In step 510, the transponder generates a transponder public key $E_t$ and a transponder private key $D_t$. In one embodiment, the transponder key pair $E_t$, $D_t$ is generated based upon a random number seed value. In another embodiment, the transponder key pair $E_t$, $D_t$ is generated based upon pseudo-random data generated in the transponder. For example, in one embodiment, the transponder uses the time of (or since) the last reader communication as a seed value. In this embodiment, the transponder information includes a field reflecting the time at which the transponder last communicated with a reader, i.e. the last toll plaza in a ETTM application, or the last other mobile commerce transaction. This time may be in seconds, rendering it a large and pseudo-random number.

In step 512, the transponder information is read from memory. A data string for transmission to the reader is generated and encrypted in step 514. The data string includes the transponder information and includes the transponder public key $E_t$. As explained in connection with FIG. 5, only a portion of the data string may be encrypted. The tag type indicator is not encrypted. The portion of the data string corresponding to the transponder public key $E_t$ may or may not be encrypted. In one embodiment, unused or unassigned data fields within the transponder information format are used to incorporate the transponder public key $E_t$. For example, the transponder public key $E_t$ may be placed within the agency data field 130. The data string is then encrypted using the reader public key $E_r$. In step 516, the encrypted data string is transmitted to the reader in the form of the response signal 18.

The reader receives the response signal 18 in step 518 and determines the tag type in step 520. In step 522, the reader extracts and stores the transponder public key $E_t$, presuming that it was not encrypted during step 514. The reader then decrypts the encrypted portion of the response using the reader private key $D_r$ in step 524. Having thereby obtained the transponder information, the reader performs transaction processing in step 526 and generates programming data in step 528. The programming data is formatted and encrypted in step 530 using the transponder public key $E_t$. In step 532, the encrypted programming data is sent to the transponder in the form of the program signal 20 (FIG. 1a).

The transponder receives the program signal 20 in step 534 and decrypts it in step 536 using the transponder private key $D_t$. It then updates the transponder information stored in memory in step 538 based upon the programming data obtained through step 536.

It will be appreciated that some of the steps of the method 500 may be performed in other sequences for other embodiments. For example, the string may be decrypted (step 524) prior to determining the tag type (step 520) and obtaining the transponder public key (step 522).

If the transponder public key $E_t$ is based upon or obtained from a field of transponder information, such as the time of the last mobile commerce transaction, then the reader may use the transponder public key $E_t$ to verify that the transponder is legitimate. In one embodiment, the transponder is verified by the reader by confirming that the transponder knows the correct encryption algorithm. The transponder may develop its key using a known value, such as the last transaction time, as a seed. Its communication with the reader may include its public key value and its last transaction time. To authenticate the transponder, the reader applies the cryptographic key generation algorithm to the received last transaction time value and it compares the resulting calculated public key value with the public key sent by the transponder. If the two keys match, then the reader has verified that the transponder is using the correct cryptographic key generation algorithm, and the transaction continues.

In another embodiment, the transponder may attempt to verify the identity of the reader. In such an embodiment, the transponder may verify whether the reader knows a secret piece of information which the transponder also knows. An example of such data may be the last transaction time, the transaction sequence number, or other such variable data. Through a central computer system to which all the readers may be connected, the reader may have access to data that was last loaded to the transponder, like the most recent transaction time. Accordingly, the transponder may verify the identity of the reader by having the reader send a piece of data, such as the last transaction time, to the transponder and comparing that data with the corresponding data stored on the transponder. If the data matches, then the transaction continues.

Figure 7:
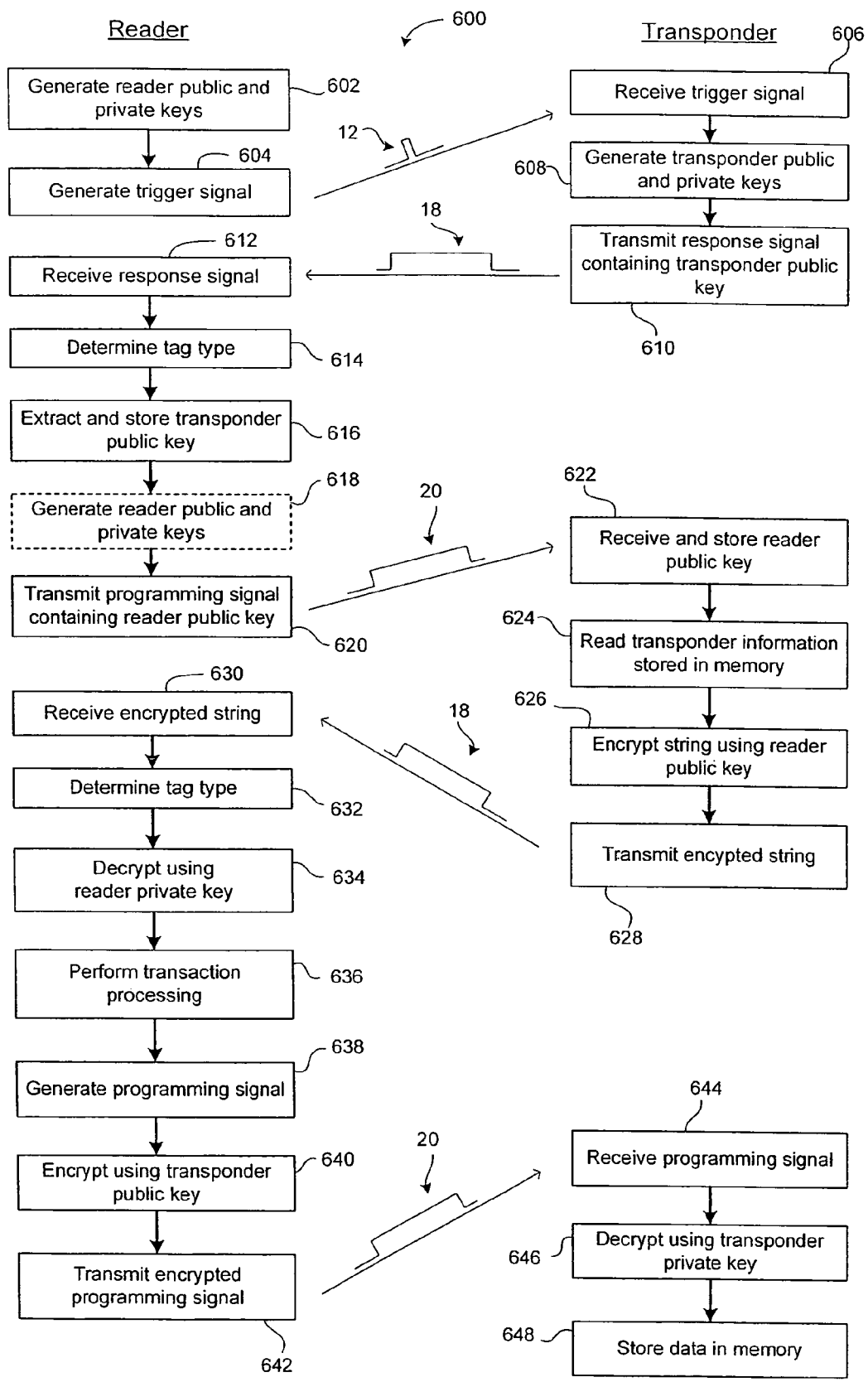
FIG. 7 diagrammatically illustrates a third method for providing encrypted communications within a mobile commerce system having a pre-defined communications protocol.

Reference is now made to FIG. 7, which diagrammatically illustrates a third method 600 for providing encrypted communications within a mobile commerce system having the Pre-defined communications protocol. The method 600 employs a public-key encryption protocol. The method 500 shown in FIG. 6 operates within the confines of a single RPV cycle of the pre-defined communications protocol. That is, the key exchanges and data exchanges are both performed within a single RPV cycle. In some embodiments, it may be difficult to provide for robust encryption using the method 500 if, as a result of the format of the pre-defined communications protocol, the keys exchanged are too short. In other words, incorporating both the data and the keys within the confines of a single RPV cycle may necessitate shorter keys, which may not provide the level of encryption security desired. Accordingly, the method 600 shown in FIG. 6 uses multiple RPV cycles to accomplish key exchange and the normal RPV functions.

The method 600 may optionally begin in step 602 with the generation of a reader public key $E_r$ and a reader private key $D_r$. In another embodiment, the reader waits to generate its key pair until step 618 (shown in phantom outline), after receiving an initial response from the transponder. In either case, in step 604 the reader transmits a trigger signal 12 (FIG. 1a) in accordance with the pre-defined communications protocol.

The transponder receives the trigger signal in step 606 and generates the transponder key pair $E_t$, $D_t$ in step 608. In step 610 the transponder transmits the response signal 18 (FIG. 1a) to the reader. The response signal 18 does not contain the transponder information, but instead contains the transponder public key $E_t$. The response signal 18 is at least partially formatted in accordance with the pre-defined communications protocol. In particular, the response signal 18 includes the tag type indicator, which may comprise the tag type field 102 (FIG. 2). In one embodiment, wherein the pre-defined protocol has a format similar to the format described in connection with FIG. 2, the response signal 18 includes one or more Factory class transponder information data fields and includes a tag type indicator to signal to the reader that this response is for key exchange. The Agency and Reader class fields may not transmitted as a part of the response signal 18, with the exception of the Error Check field 128 (FIG. 2). In their place, the transponder public key $E_t$ is incorporated as a part of the data sting forming the response signal. In such an embodiment, the transponder public key $E_t$ may have a length of 184 bits.

The reader receives the response signal 18 in step 612 and recognizes the tag type in step 614 based upon receipt of the tag type indicator. The reader extracts and stores the transponder public key $E_t$ in step 616. In step 620, the reader transmits the reader public key $E_r$ in the form of the program signal 20 (FIG. 1a). The program signal 20 is not intended for updating the transponder information, so it does not contain programming data. The program signal 20 may include a flag or indicator to notify the transponder that this is program signal 20 is for key exchange. Unused fields of the program signal 20 are used to communicate the reader public key $E_r$.

The transponder receives the program signal 20 in step 622 and extracts and stores the reader public key $E_r$. In step 624, in response to the receipt of the program signal 20 containing the reader public key $E_r$, the transponder reads its transponder information from memory and creates a corresponding data string. The data string is then at least partially encrypted in step 626 using the reader public key $E_r$, and is transmitted to the reader in step 628 as the response signal 18.

In an alternative embodiment, the transponder may not automatically transmit its transponder information to the reader without receiving a further trigger signal 12. In this case, the reader may re-send a trigger signal 12 after sending the reader public key $E_r$. In response to the second trigger signal 12, the transponder would send a response signal containing the transponder information encrypted using the reader public key $E_r$. For this embodiment to function, the transponder may employ a session management scheme in order to remember that it has received a second trigger signal 12 from the same reader and that it has already received the appropriate reader public key $E_r$ to enable an encrypted response. The session management scheme may comprise checking whether a reader public key is stored in a particular memory location. The memory may also store a time at which the key was received so that the transponder may determine whether the session has timed out. Other mechanisms for maintaining sessions will be apparent to those or ordinary skill in the art having regard to the present description.

The reader receives the transponder response signal in step 630, determines the tag type in step 632, and decrypts the response in step 634 using the reader private key $D_r$. It then performs transaction processing operations in step 636, generates programming data in step 638, and encrypts the programming data in step 640 using the transponder public key $E_t$. The encrypted programming data is sent to the transponder in the form of the program signal 20 (FIG. 2) in step 642.

In step 644, the transponder receives the program signal 20 and it decrypts the program signal in step 646 using the transponder private key $D_t$. In step 648, the decrypted programming data is used to update the transaction data stored in memory.

Figure 8:
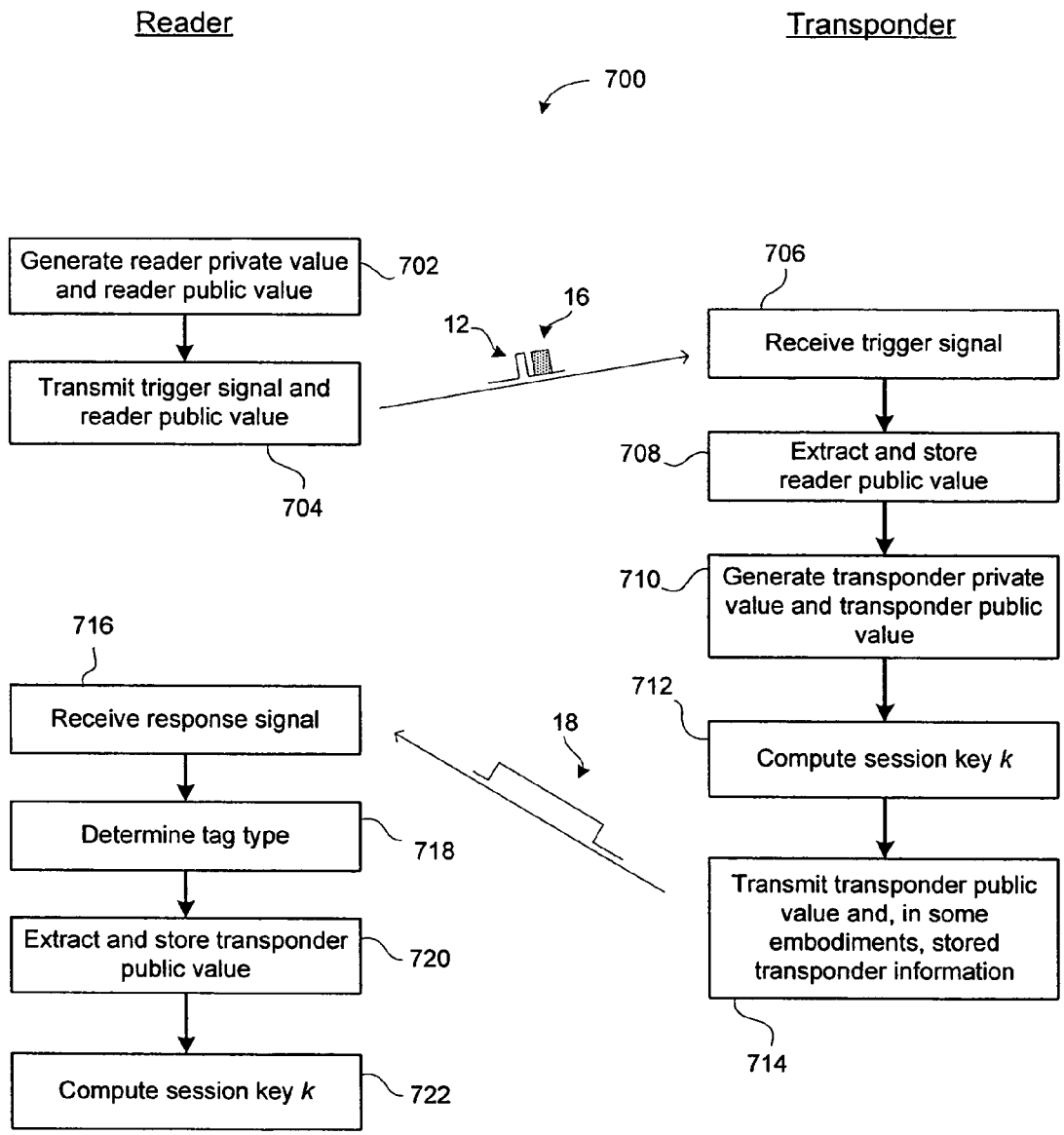
FIG. 8 diagrammatically illustrates a fourth method for providing encrypted communications within a mobile commerce system having a pre-defined communications protocol.

Reference is now made to FIG. 8, which shows a fourth method 700 for providing encrypted communications within a mobile commerce system having a pre-defined communications protocol. The method 700 employs the Diffie-Hellman key agreement protocol to establish a secret key shared between the reader and the transponder. The protocol requires two parameters p and g, wherein p is a prime number and g is an integer less than p, with the property that for every number n between 1 and p−1 inclusive, there is a power k of g such that $n = g^k \mod p$.

The method 700 begins in step 702, when the reader generates a private value a and a public value $g^a \mod p$, where the private value a is drawn from the set of integers from 1 to p−2. In step 704, the reader sends its public value to the transponder. The public value may be sent with the trigger signal 12. As discussed above, the public value may be encoded within the trigger (or wakeup) signal or within a separate beacon signal. In another embodiment, wherein the pre-defined communications protocol prescribes transmission of a polling message prior to the transponder response, the public value is sent within a key information signal, a key beacon signal, or a reader polling message.

In steps 706 and 708, the transmission is received by a transponder and the reader public value is extracted and stored. The transponder generates its own public and private values in step 710. In particular, the transponder generates random private value b, which is an integer from 1 to p−2, and the transponder public value comprises $g^b \mod p$. Based upon the reader public value and the transponder private value, the transponder may calculate a session key k in step 712. The transponder generates the session key k from the relation $k = g^{ba} = (g^a)^b \mod p$.

The transponder sends its transponder public value to the reader in step 714. The transponder public value may be encoded within the transponder response signal 18. In one embodiment, the transponder response signal 18 further includes the stored transponder information, such as the transponder ID number and other data, which is encrypted using the session key k. The transponder public value may or may not be encrypted. If it is encrypted, then it is encrypted using the reader public value and not the session key k, since the reader is not capable of generating the session key k until it receives the transponder public value. Accordingly, the transponder sends its public value and its stored transponder information in the transponder response signal 18. Therefore, in this embodiment the transaction may be completed within a single RPV cycle.

In another embodiment, multiple RPV cycles may be used to complete the transaction. In such an embodiment, the transponder response signal 18 may not contain the stored transponder information, or all of the necessary stored transponder information.

The reader receives the response signal 18 in step 716. In step 718, the reader may determine the tag type. For example, the response signal 18 may include a tag type indicator which is evaluated by the reader. In another embodiment, the response signal 18 may be encrypted, for example using the reader public key, and the reader may perform a data integrity check to determine the tag type.

In step 720, the reader extracts and stores the transponder public key. The session key k is generated by the reader in step 722. The reader generates the session key k from the relation $k = g^{ab} = (g^b)^a \mod p$. All subsequent communications between the transponder and the reader during the session may be encrypted using the shared secret session key k. For example, if the reader transmits a programming signal it will be encrypted using the session key k.

It will be appreciated by those of ordinary skill in the art that any of the foregoing key exchange protocols or methods may be supplemented with an authentication protocol, such as that described above in connection with FIG. 6.

Those of ordinary skill in the art will appreciate that certain steps within the methods 300, 400, 500, 600, 700 described herein may be performed in other sequences without substantial effect. It will also be appreciated that the steps, functions, and/or operations described may be implemented using programmable logic devices or ASICs operating under program control, which may be stored in memory, e.g. firmware, or otherwise.

It will be understood that some of the operations and/or functions described in the foregoing description may be implemented by the RF transceivers 208, 218 (FIG. 3), by the controllers 210, 220 (FIG. 3), or by a separate component. Those of ordinary skill in the art will appreciate that many of the modules, component, functions, and operation described herein may be implemented using logic devices, including microprocessors, digital signal processors, ASICs, and/or discrete logic devices, using analog devices, or using a combination of both. The suitable programming of any programmable devices to implement the modules, operations, or functions described herein will be within the knowledge of those of ordinary skill in the art having regard to the foregoing description.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for secure mobile commerce within a mobile commerce system having a pre-defined communications protocol, the mobile commerce system including a plurality of readers and a plurality of transponders, the plurality of transponders including first transponders having an unencrypted communications format and second transponders having an encrypted communications format, the method comprising the steps of:
   transmitting a trigger signal from one of said plurality of readers;
   receiving a response signal from one of said transponders;
   testing said response signal to determine whether said response signal is from one of said first transponders or one of said second transponders;
   engaging in unencrypted communications with said one of said transponders in accordance with the unencrypted communications format if said response signal was received from one of said first transponders; and
   engaging in encrypted communications with said one of said transponders in accordance with the encrypted communications format if said response signal was received from one of said second transponders.

2. The method claimed in claim 1, wherein said response signal includes a tag type indicator, and wherein said step of testing includes reading said tag type indicator.

3. The method claimed in claim 2, wherein said response signal includes an encoded data string and wherein said tag type indicator includes a tag type field within said encoded data string.

4. The method claimed in claim 1, wherein said step of testing includes performing a data integrity check of said response signal, said data integrity check indicating whether said response signal is from one of said first transponders or one of said second transponders.

5. The method claimed in claim 4, wherein said step of testing includes performing said data integrity check upon said response signal, decrypting said response signal to produce a decrypted response signal, and performing said data integrity check upon said decrypted response signal.

6. The method claimed in claim 5, wherein said step of transmitting said trigger signal includes transmitting a reader public key, and wherein said response signal includes a signal encrypted using said reader public key.

7. The method claimed in claim 1, wherein said response signal includes a transponder public value.

8. The method claimed in claim 7, including a step of transmitting a polling message after said step of transmitting said trigger signal and prior to said step of receiving said response signal, and wherein said polling message includes a reader public value.

9. The method claimed in claim 7, wherein step of transmitting said trigger signal includes transmitting a beacon signal, said beacon signal including a reader public value.

10. The method claimed in claim 7, including a step of transmitting a program signal to said one of said transponders, said program signal including a reader public value.

11. The method claimed in claim 7, including a step of transmitting a reader public key and wherein said transponder public value comprises a transponder public key.

12. The method claimed in claim 7, wherein each of said transponders includes a memory storing transponder information, and wherein said response signal includes said transponder information.

13. The method claimed in claim 1, further including a step of generating a reader private value and a reader public value and a step of receiving a transponder public value, and wherein said method further includes a step of generating a session key for use in said encrypted communications.

14. The method claimed in claim 13, wherein said step of receiving said transponder public value includes extracting said transponder public value from said response signal.

15. The method claimed in claim 13, further including a step of transmitting said reader public value.

16. The method claimed in claim 13, wherein said step of generating said session key includes generating said session key based lipon said reader private value and said transponder public value.

17. The method claimed in claim 1, further including a step of authenticating said transponder.

18. The method claimed in claim 17, wherein said step of authenticating includes hashing a known value using a hash algorithm to produce a result value and comparing a hashed value received from said one of said transponders with said result value to determine if said one of said transponders knows said hash algorithm.

19. The method claimed in claim 1, further including a step of authenticating said reader.

20. The method claimed in claim 19, wherein said step of authenticating includes, at one of said transponders, steps of hashing a known value using a hash algorithm to produce a result value and comparing a hashed value received from said reader with said result value to determine if said reader knows said hash algorithm.

21. A system for secure mobile commerce within a mobile commerce system having a pre-defined communications protocol, said system comprising:
   a reader, including a transmitter for transmitting a trigger signal and a program signal, and a receiver for receiving a response signal; and
   a plurality of transponders, each of said transponders including a transceiver for transmitting said response signal, and said transponders including first transponders having an unencrypted communications format and second transponders having an encrypted communications format, said reader including a tag type analyzer coupled to said receiver for testing said response signal to determine whether said response signal is from one of said first transponders or one of said second transponders, and said reader including a communications module for reading said response signal and generating said program signal, wherein said communications module operates in accordance with said unencrypted communication format or said encrypted communications format in response to said tag type analyzer.

22. The system claimed in claim 21, wherein said response signal includes a tag type indicator, and wherein said tag type analyzer determines whether said response signal is from one of said first transponders or one of said second transponders based upon said tag type indicator.

23. The system claimed in claim 22, wherein said response signal includes an encoded data string and wherein said tag type indicator comprises a tag type field within said encoded data string.

24. The system claimed in claim 21, wherein said tag type analyzer includes a data integrity check component for checking data integrity of said response signal to determine whether said response signal is from one of said first transponders or one of said second transponders.

25. The system claimed in claim 24, wherein said tag type analyzer further includes a decryption component for decrypting said response signal and outputting a decrypted response signal, and wherein said data integrity check component includes a component for checking data integrity of said decrypted response signal.

26. The system claimed in claim 21, wherein said response signal includes a transponder public value.

27. The system claimed in claim 26, wherein said communications module includes an encryption/decryption module for applying said encrypted communication format, and wherein said encryption/decryption module includes a key generation component for generating a reader public value and a reader private value.

28. The system claimed in claim 27, wherein said communications module generates a polling message for transmission to said one of said transponders by said transceiver, and wherein said polling message includes said reader public value.

29. The system claimed in claim 27, wherein said communications module generates a beacon signal for transmission to said one of said transponders by said transceiver, and wherein said beacon signal includes said reader public value.

30. The system claimed in claim 27, wherein said program signal includes said reader public value.

31. The system claimed in claim 27, wherein said encryption/decryption module includes a session key component for generating a session key based upon said reader private value and said transponder public value.

32. The system claimed in claim 27, wherein said encryption/decryption module includes an authentication component for authenticating said transponder.

33. The system claimed in claim 26, wherein said transponders each include a memory, said memory containing transponder information, and wherein said response signal includes said transponder information.

34. The system claimed in claim 27, wherein said transponder includes an authentication component for authenticating said reader.

* * * * *